United States Patent
Wu et al.

(10) Patent No.: US 11,832,217 B2
(45) Date of Patent: Nov. 28, 2023

(54) SIDELINK FEEDBACK TRANSMISSION IN RESOURCE POOL

(71) Applicant: QUALCOMM Incorporated, San Diego, CA (US)

(72) Inventors: Shuanshuan Wu, San Diego, CA (US); Kapil Gulati, Montgomery, NJ (US); Sudhir Kumar Baghel, Hillsborough, NJ (US); Gabi Sarkis, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/031,590

(22) Filed: Sep. 24, 2020

(65) Prior Publication Data

US 2021/0099975 A1 Apr. 1, 2021

Related U.S. Application Data

(60) Provisional application No. 62/908,537, filed on Sep. 30, 2019.

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1819* (2013.01); *H04W 72/0446* (2013.01); *H04W 92/18* (2013.01)

(58) Field of Classification Search
CPC . H04W 72/02; H04W 72/0446; H04W 92/18; H04L 1/1819
See application file for complete search history.

(56) References Cited

U.S. PATENT DOCUMENTS

2011/0249644 A1* 10/2011 Boariu ................ H04W 72/042 455/450
2019/0268971 A1 8/2019 Talarico et al.
(Continued)

FOREIGN PATENT DOCUMENTS

CN 110291739 A 9/2019

OTHER PUBLICATIONS

Huawei: et al., "Design and Contents of PSCCH and PSFCH", 3GPP Draft, 3GPP TSG RAN WG1 Meeting #96bis, R1-1904689, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 2, 2019 (Apr. 2, 2019), XP051707282, 9 pages, Retrieved from the Internet: URL: http://www.3gpp.org/ftp/tsg%5Fran/WG1%5FRL1/TSGR1%5F96b/Docs/R1%2D1904689%2Ezip. [retrieved on Apr. 2, 2019] figures 5J-10.
(Continued)

*Primary Examiner* — Benjamin H Elliott, IV
*Assistant Examiner* — Nevena Zecevic Sandhu
(74) *Attorney, Agent, or Firm* — Patterson + Sheridan, L.L.P

(57) ABSTRACT

A first user equipment (UE) can determine a slot, from a resource pool including a plurality of slots allocated for sidelink communications, for providing hybrid automatic repeat request (HARQ) feedback to a second UE via a sidelink channel. The determination may be based on a physical slot index or a logical slot index. The first UE may send the HARQ feedback on the sidelink channel in the slot, or refrain from sending the HARQ feedback, based on the determination. The first UE may determine the slot has a first slot index that is at least a preconfigured number of slots after a slot scheduled for sidelink data transmission having a second slot index.

24 Claims, 11 Drawing Sheets

(51) Int. Cl.
*H04W 72/0446* (2023.01)
*H04W 92/08* (2009.01)
*H04W 92/18* (2009.01)

(56) References Cited

U.S. PATENT DOCUMENTS

| 2020/0052811 | A1* | 2/2020 | Li | H04L 5/1469 |
| 2020/0280981 | A1* | 9/2020 | Shin | H04L 5/0092 |
| 2020/0374978 | A1* | 11/2020 | Panteleev | H04W 88/04 |
| 2021/0050950 | A1* | 2/2021 | Zhou | H04W 72/042 |
| 2021/0050953 | A1* | 2/2021 | Park | H04L 5/0094 |
| 2021/0314109 | A1* | 10/2021 | Zhao | H04L 5/0094 |

OTHER PUBLICATIONS

Intel Corporation: "NR V2X Sidelink Physical Layer Procedures", 3GPP Draft, R1-1908638, Intel—EV2X SL L1 Procedure, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019- Aug. 30, 2019, Aug. 17, 2019 (Aug. 17, 2019), XP051765246, 16 pages, Retrieved from the Internet: URL: http://www.3gpp.org/ftp/tsg_ran/WG1_RL1/TSGR1_98/Docs/R1-1908638.zip. [retrieved on Aug. 17, 2019] p. 1. section 2.1 p. 7. section 2.2.4.

International Search Report and Written Opinion—PCT/US2020/052695—ISA/EPO—dated Dec. 15, 2020.

Samsung: "Discussion on Possible Techniques for LTE URLLC", 3GPP Draft, 3GPP Tsg Ran WG1 Meeting 91, R1-1720271—Discussion on Possible Techniques for LTE URLLC, 3rd Generation Partnership Project (3GPP), Mobile Competence Centre, 650, Route Des Lucioles, F-06921 Sophia-Antipolis Cedex, vol. RAN WG1, No. Renot USA, Nov. 27, 2017-Dec. 1, 2017, Nov. 21, 2017 (Nov. 21, 2017), XP051370432, 4 pages, Retrieved from the Internet: URL: http://www.3gpp.org/ftp/tsg%5Fran/WG1%5FRL1/TSGR1%5F91/Docs/. section 2.2. Figure 1.

Samsung: "On Sidelink HARQ Procedure", 3GPP Draft, 3GPP TSG RAN WG1 #97, R1-1906948, On SL HARQ Procedure, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728398, 11 pages, Retrieved from the Internet: URL: http://www.3gpp.org/ftp/Meetings%5F3GPP%5FSYNC/RAN1/Docs/R1%2D1906948%2Ezip. [retrieved on May 13, 2019] section 3.

ZTE, et al., "NR Sidelink Physical Layer Structure," 3GPP Draft, 3GPP TSG RAN WG1 #98, R1-1908894, Sidelink Physical Structure, 3rd Generation Partnership Project (3GPP), Mobile Competence Centre, 650, Route Des Lucioles, F-06921, Sophia-Antipolis Cedex, France, vol. RAN WG1, No. Prague, CZ Aug. 26, 2019- Aug. 30, 2019, Aug. 17, 2019 (Aug. 17, 2019), XP051765502, 19 pages, pp. 11-14, 7 SCI format.

* cited by examiner

SIDELINK FEEDBACK TRANSMISSION IN RESOURCE POOL

CROSS-REFERENCE TO RELATED APPLICATION(S)

This application claims benefit of and priority to U.S. Provisional Application No. 62/908,537, filed Sep. 30, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications and, more particularly, to techniques for a feedback transmission in resource pool, which may be used between user equipments (UEs) via a sidelink channel.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink feedback transmission in resource pool.

One or more innovative aspects of the subject matter described in this disclosure can be implemented in a method for wireless communication by a first user equipment (UE). The method generally includes determining a slot, from a resource pool comprising a plurality of slots allocated for sidelink communications, for providing hybrid automatic repeat request (HARQ) feedback to a second UE via a sidelink channel. The first UE can determine the slot has a first physical slot index that is at least a preconfigured number of physical slots after a slot scheduled for sidelink data transmission having a second physical slot index. The method generally includes sending or refraining from sending the HARQ feedback on the sidelink channel in the slot based on the determination.

One or more innovative aspects of the subject matter described in this disclosure can be implemented in a method for wireless communication by a first UE. The method generally includes determining a slot, from a resource pool comprising a plurality of slots allocated for sidelink communications, for providing HARQ feedback to another apparatus via a sidelink channel. The first UE can determine the slot has a first logical slot index that is at least a preconfigured number of logical slots after a slot scheduled for sidelink data transmission having a second logical slot index. The method generally includes sending or refraining from sending the HARQ feedback on the sidelink channel in the slot based on the determined slot.

One or more innovative aspects of the subject matter described in this disclosure can be implemented in an apparatus for wireless communication by a first UE. The apparatus generally includes at least one processor and a memory coupled to the at least one processor. The memory generally includes code executable by the at least one processor to cause the apparatus to determine a slot, from a resource pool comprising a plurality of slots allocated for sidelink communications, for providing HARQ feedback to a second UE via a sidelink channel. The apparatus can determine the slot has a first physical slot index that is at least a preconfigured number of physical slots after a slot scheduled for sidelink data transmission having a second physical slot index. The memory generally includes code executable by the at least one processor to cause the apparatus send or refrain from sending the HARQ feedback on the sidelink channel in the slot based on the determination.

One or more innovative aspects of the subject matter described in this disclosure can be implemented in an apparatus for wireless communication by a first UE. The apparatus generally includes at least one processor and a memory coupled to the at least one processor. The memory generally includes code executable by the at least one processor to cause the apparatus to determine a slot, from a resource pool comprising a plurality of slots allocated for sidelink communications, for providing HARQ feedback to another apparatus via a sidelink channel. The apparatus can determine the slot has a first logical slot index that is at least a preconfigured number of logical slots after a slot scheduled for sidelink data transmission having a second logical slot index. The memory generally includes code executable by the at least one processor to cause the apparatus to send or refrain from sending the HARQ feedback on the sidelink channel in the slot based on the determined slot.

One or more innovative aspects of the subject matter described in this disclosure can be implemented in an apparatus for wireless communication by a first UE. The apparatus generally includes means for determining a slot, from a resource pool comprising a plurality of slots allocated for sidelink communications, for providing HARQ feedback to a second UE via a sidelink channel. The apparatus can determine the slot has a first physical slot index that is at least a preconfigured number of physical slots after a slot scheduled for sidelink data transmission having a second physical slot index. The apparatus generally includes means for sending or refraining from sending the HARQ feedback on the sidelink channel in the slot based on the determination.

One or more innovative aspects of the subject matter described in this disclosure can be implemented in an apparatus for wireless communication by a first UE. The apparatus generally includes means for determining a slot, from a resource pool comprising a plurality of slots allocated for sidelink communications, for providing HARQ feedback to another apparatus via a sidelink channel. The apparatus can determine the slot has a first logical slot index that is at least a preconfigured number of logical slots after a slot scheduled for sidelink data transmission having a second logical slot index. The apparatus generally includes means for sending or refraining from sending the HARQ feedback on the sidelink channel in the slot based on the determined slot.

One or more innovative aspects of the subject matter described in this disclosure can be implemented in a computer readable medium storing computer executable code thereon for wireless communication by a first UE. The computer executable code generally includes code for determining a slot, from a resource pool comprising a plurality of slots allocated for sidelink communications, for providing HARQ feedback to a second UE via a sidelink channel. The first UE can determine the slot has a first physical slot index that is at least a preconfigured number of physical slots after a slot scheduled for sidelink data transmission having a second physical slot index. The computer executable code generally includes code for sending or refraining from sending the HARQ feedback on the sidelink channel in the slot based on the determination.

One or more innovative aspects of the subject matter described in this disclosure can be implemented in a computer readable medium storing computer executable code thereon for wireless communication by a first UE. The computer executable code generally includes code for determining a slot, from a resource pool comprising a plurality of slots allocated for sidelink communications, for providing HARQ feedback to another apparatus via a sidelink channel. The first UE can determine the slot has a first logical slot index that is at least a preconfigured number of logical slots after a slot scheduled for sidelink data transmission having a second logical slot index. The computer executable code generally includes code for sending or refraining from sending the HARQ feedback on the sidelink channel in the slot based on the determined slot.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
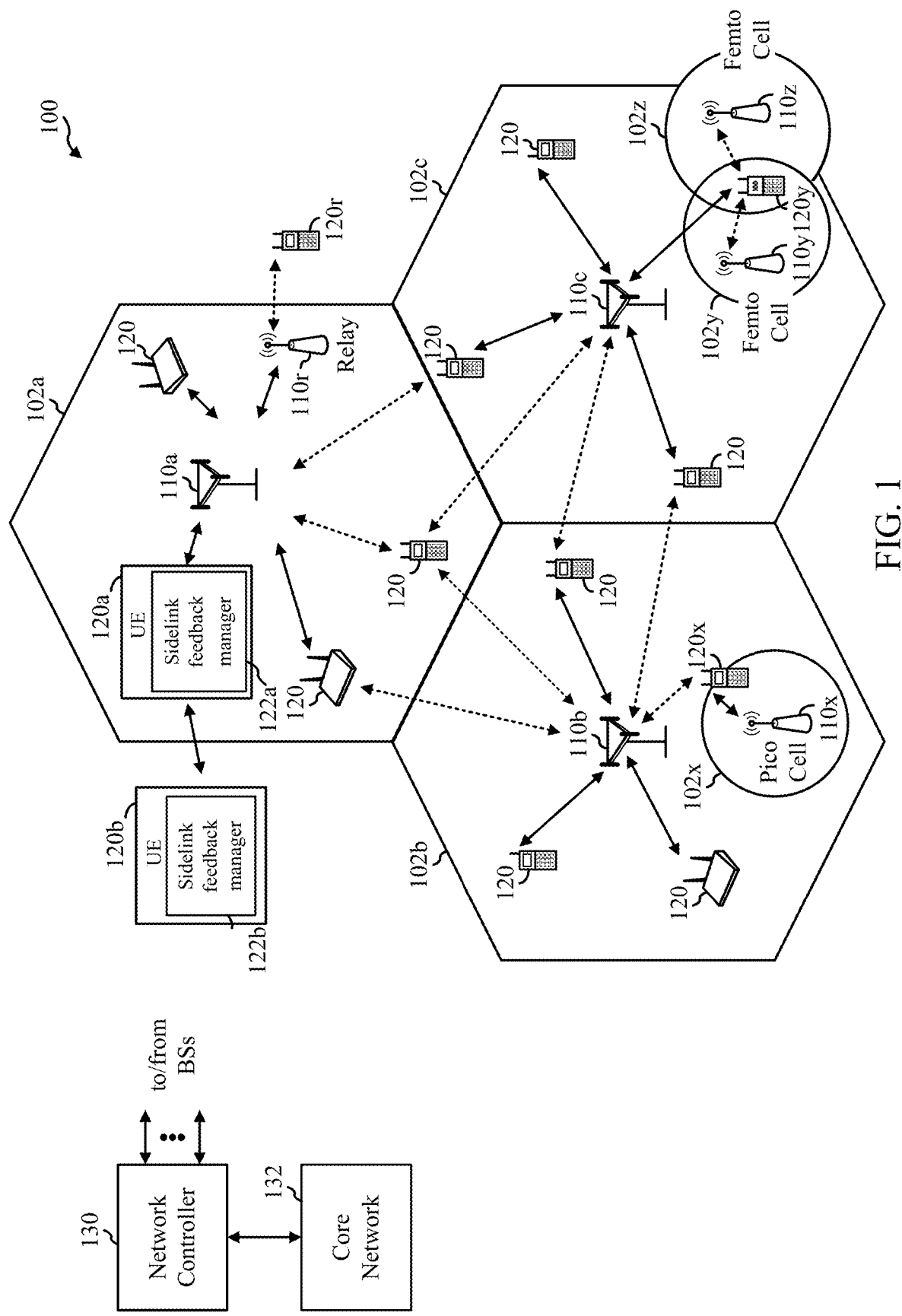
FIG. 1 is a block diagram conceptually illustrating an example telecommunications system, in accordance with certain aspects of the present disclosure.

Aspects of the present disclosure provide apparatus, methods, processing systems, and computer readable mediums for sidelink feedback in a resource pool. As will be described, the techniques presented herein allow sidelink feedback behavior, even when a sidelink resource includes physically non-consecutive slots and/or partially available slots.

The following description provides examples of sidelink feedback in s resource pool that may be used for sidelink in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for sidelink communications. As shown in FIG. 1, the UE 120a includes a sidelink feedback manager 122a and the UE 120b includes a sidelink feedback manager 122b. The sidelink feedback manager 122a and/or the sidelink feedback manager 122b may be configured to determine a slot from a resource pool for providing sidelink feedback, in accordance with aspects of the present disclosure. The sidelink feedback manager 122a and/or the sidelink feedback manager 122b may be configured to determine the slot based on physical or logical slot index. The sidelink feedback manager 122a and/or the sidelink feedback manager 122b may be configured to send or drop (e.g., refrain from sending) the feedback based on the determined slot.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
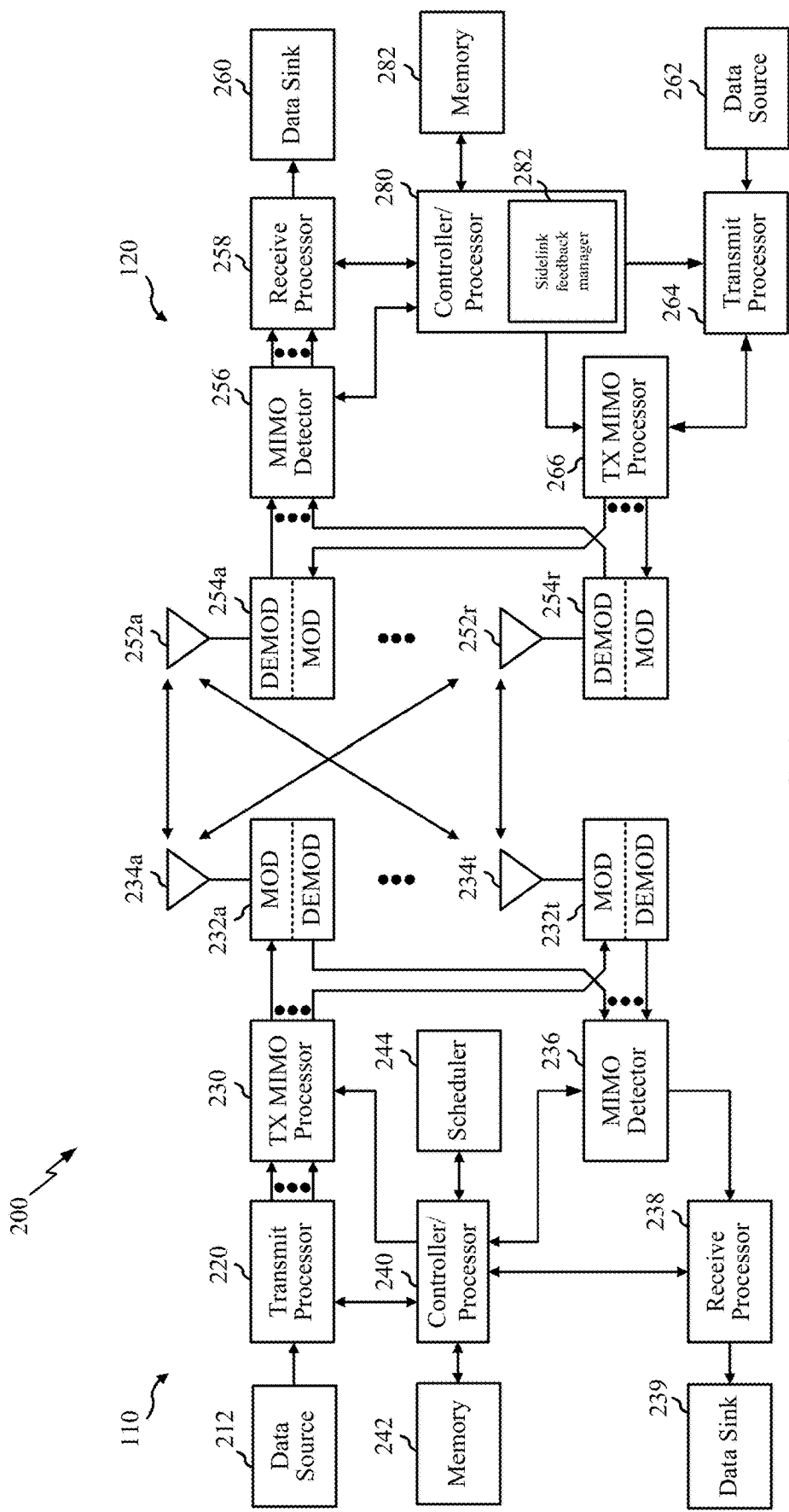
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1, which may be similar components in the UE 120b), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a BS may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) of transceivers 232*a*-232*t*. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators in transceivers 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 280 of the UE 120*a* has a sidelink feedback manager 222 that may be configured for sidelink feedback transmission in resource pool, in accordance with aspects of the present disclosure. Although shown at the controller/processor, other components of the UE 120*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
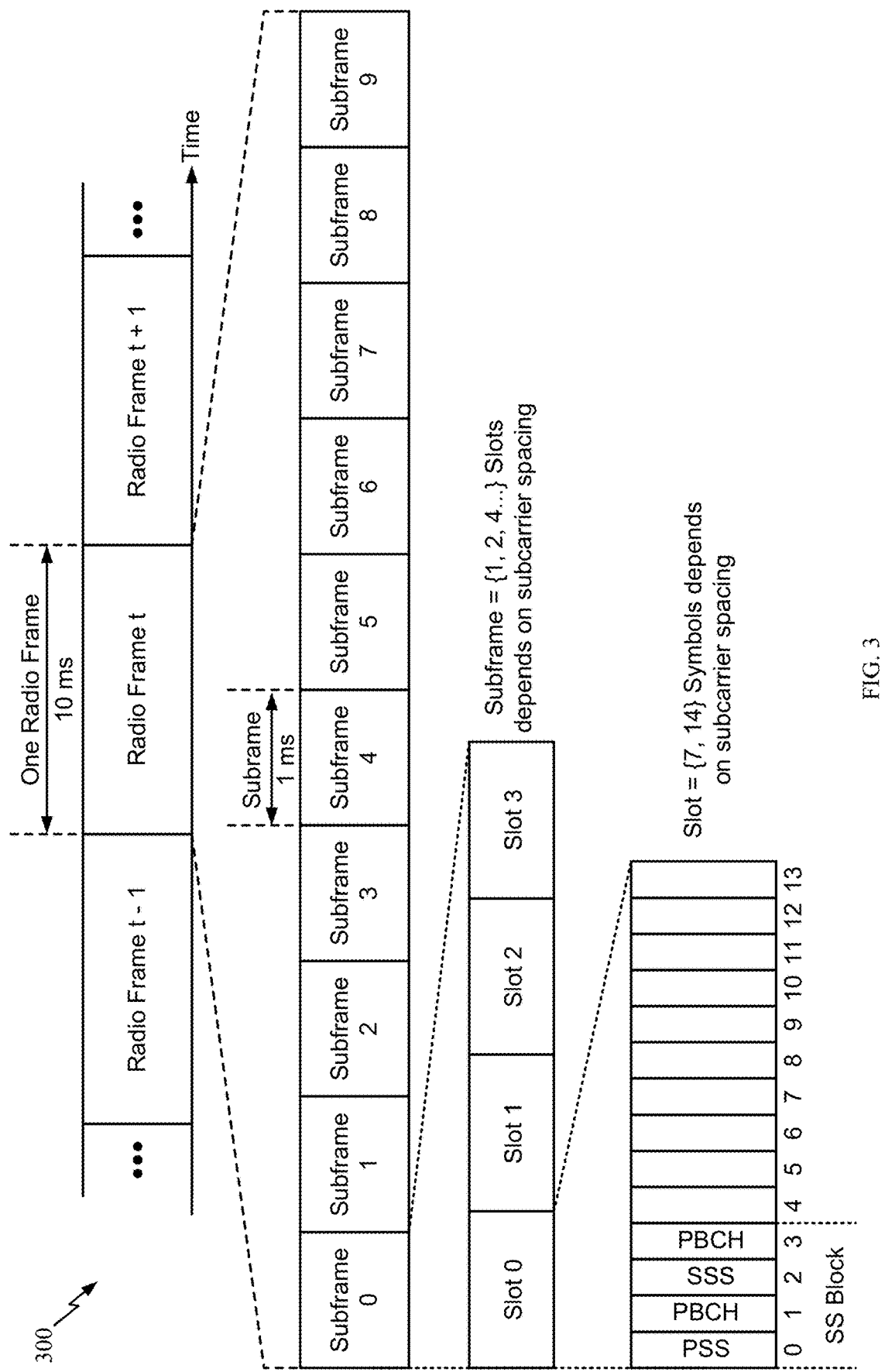
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Figure 4:
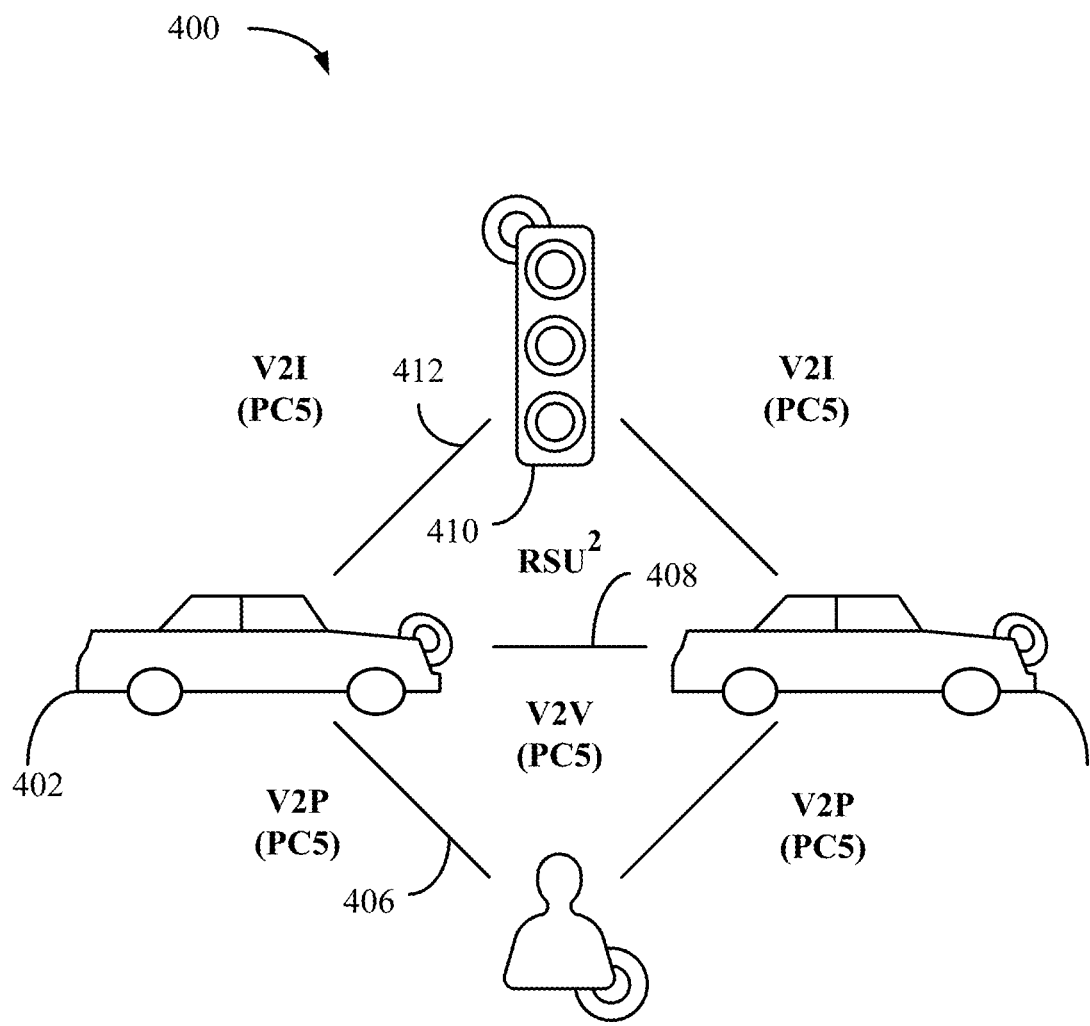
FIG. 4 illustrates an example vehicle-to-everything (V2X) communication system, in accordance with certain aspects of the present disclosure.
Figure 5:
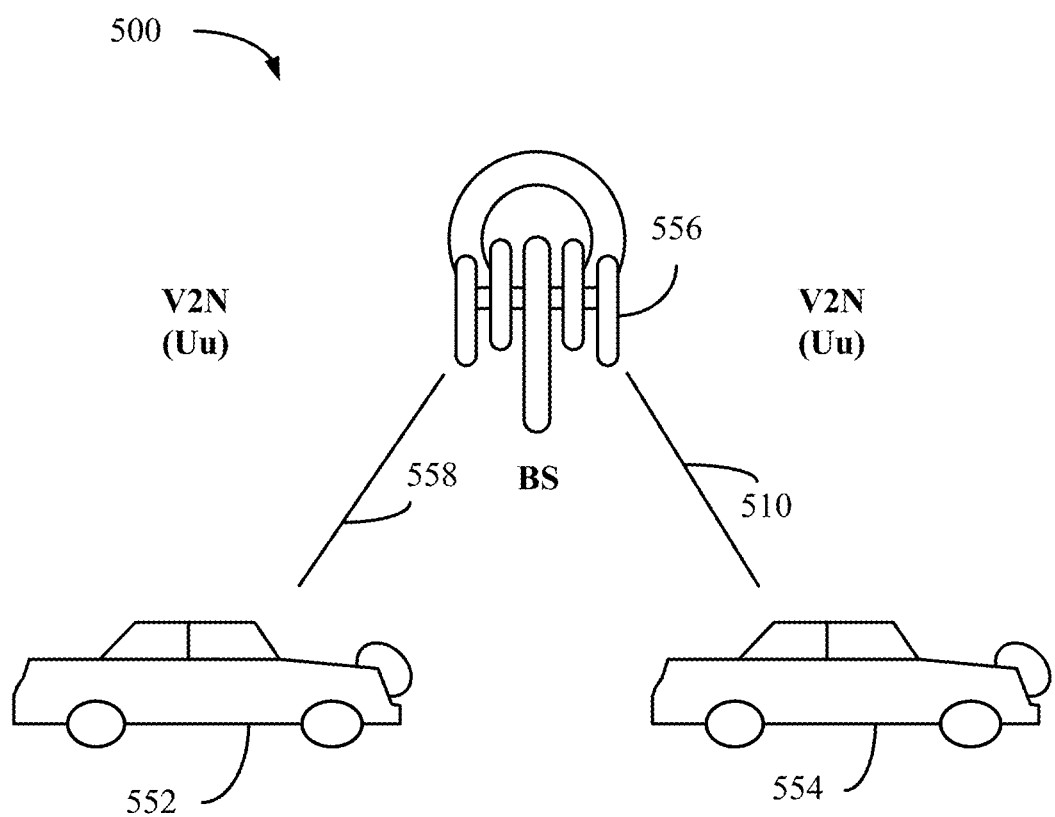
FIG. 5 illustrates another example V2X communication system, in accordance with certain aspects of the present disclosure.

FIG. 4 and FIG. 5 show diagrammatic representations of example vehicle to everything (V2X) systems in accordance with some aspects of the present disclosure. For example, the vehicles shown in FIG. 4 and FIG. 5 may communicate via sidelink channels and may perform sidelink CSI reporting as described herein.

The V2X systems, provided in FIG. 4 and FIG. 5 provide two complementary transmission modes. A first transmission mode, shown by way of example in FIG. 4, involves direct communications (for example, also referred to as side link communications) between participants in proximity to one another in a local area. A second transmission mode, shown by way of example in FIG. 5, involves network communications through a network, which may be implemented over a Uu interface (for example, a wireless communication interface between a radio access network (RAN) and a UE).

Referring to FIG. 4, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 500 for communication between a vehicle 552 and a vehicle 554 through a network entity 556. These network communications may occur through discrete nodes, such as a BS (for example, an eNB or gNB), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/ weather reports, and service station availability, among other examples. Such data can be obtained from cloud-based sharing services.

As mentioned above, aspects of the present disclosure relate to techniques for managing sidelink feedback using a resource pool.

Feedback, such as HARQ feedback (e.g., ACK/NACK), may be used in sidelink communications. For example, a sidelink UE may transmit HARQ feedback on the PSFCH to acknowledge a sidelink data transmission on the PSSCH.

Sidelink communications may be distributed and, therefore, HARQ feedback transmission rules (e.g., HARQ timelines, UE behavior, etc.) known at both UEs (the UE transmitting the feedback and the UE receiving the feedback) are useful so the UEs can monitor, interpret, and understand the feedback. In some examples, HARQ feedback rules can be configured at the UEs (e.g., by the network or BS).

In access link communications, scheduling for data transmissions for both uplink and downlink may be done by the BS (e.g., a gNB). In sidelink scenarios, however, the UE may perform the scheduling. In some examples, the data-transmitting UE selects the resources for transmission (e.g., data and/or feedback transmission) from a resource pool (or resource pools). The resource pool(s) may be resources allocated for sidelink transmission (e.g., configured by the BS, or preconfigured at the UE).

In some examples (e.g., sidelink operating on unlicensed spectrum or intelligent transportation spectrum (ITS)), the resources may be used only for sidelink. In some examples (e.g., sidelink operating on licensed spectrum), the resources may be shared with other communications and, therefore, the resource pool(s) for sidelink communications may contain only part of the time/frequency resources of the system (e.g., a sidelink resource pool may consists of only part of cellular, Uu, resources). For example, only a portion of the uplink slots or symbols may be allocated to sidelink (e.g., in a TDD or an FDD system) and/or in the slots allocated for sidelink only a portion of the frequency resources (e.g., RBs) may be allocated for sidelink (e.g., in a TDD or an FDD system). In some examples, other symbols or RBs in those slots may be allocated for uplink and/or downlink, or other communications.

Figure 6:
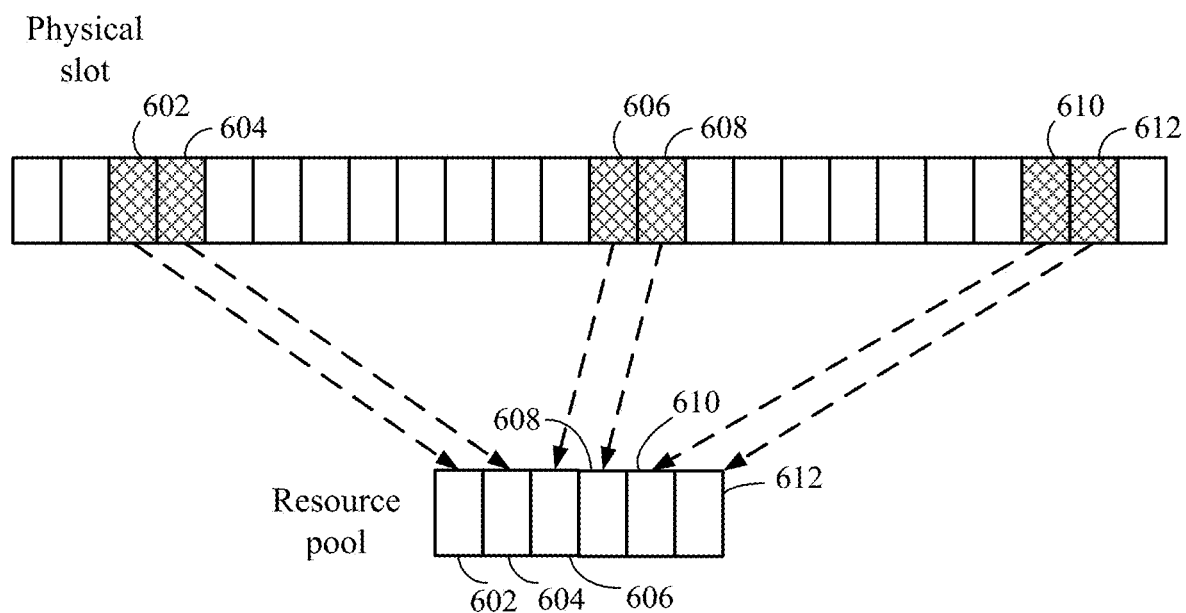
FIG. 6 is a diagram illustrating example non-consecutive physical slots corresponding to logical slots in a sidelink resource pool, in accordance with certain aspects of the present disclosure.

Thus, the sidelink resource pool (i.e., the resources in the system allocated for sidelink communication) may include slots that are not physically consecutive and/or slots in which only a portion of the RBs or OFDM symbols are allocated for sidelink. FIG. 6 is a diagram illustrating example non-consecutive physical slots corresponding to logical slots in a sidelink resource pool, in accordance with certain aspects of the present disclosure. As shown in FIG. 6, the resource pool includes the slots 602, 604 608, 610, 612 including slots that are not physically consecutive (e.g., although they may be considered logically consecutive within the resource pool). For example, the slots 604 and 406 may be logically consecutive within the resource pool, but are physically non-consecutive slot and similarly, slots 608 and 610 are logically consecutive within the resource pool but are physical non-consecutive slots. In addition, although not shown in FIG. 6, some of the slots 602-612 in the resource pool may include only a portion of symbols and/or a portion RBs, within the slot, that are allocated for sidelink.

Accordingly, techniques and apparatus are desirable for sidelink feedback in a resource pool, that may be used even when slots in the resource pool are physically non-consecutive and/or when slots in the resource pool include a portion (e.g., less than all) of the symbols or RBs.

Example Sidelink Feedback with Resource Pool

According to certain aspects, a timeline may be used for sidelink feedback, such as hybrid automatic repeat request (HARQ) feedback. The HARQ feedback may include HARQ ACK/NACK (acknowledgment/negative acknowledgement) feedback.

Figure 7:
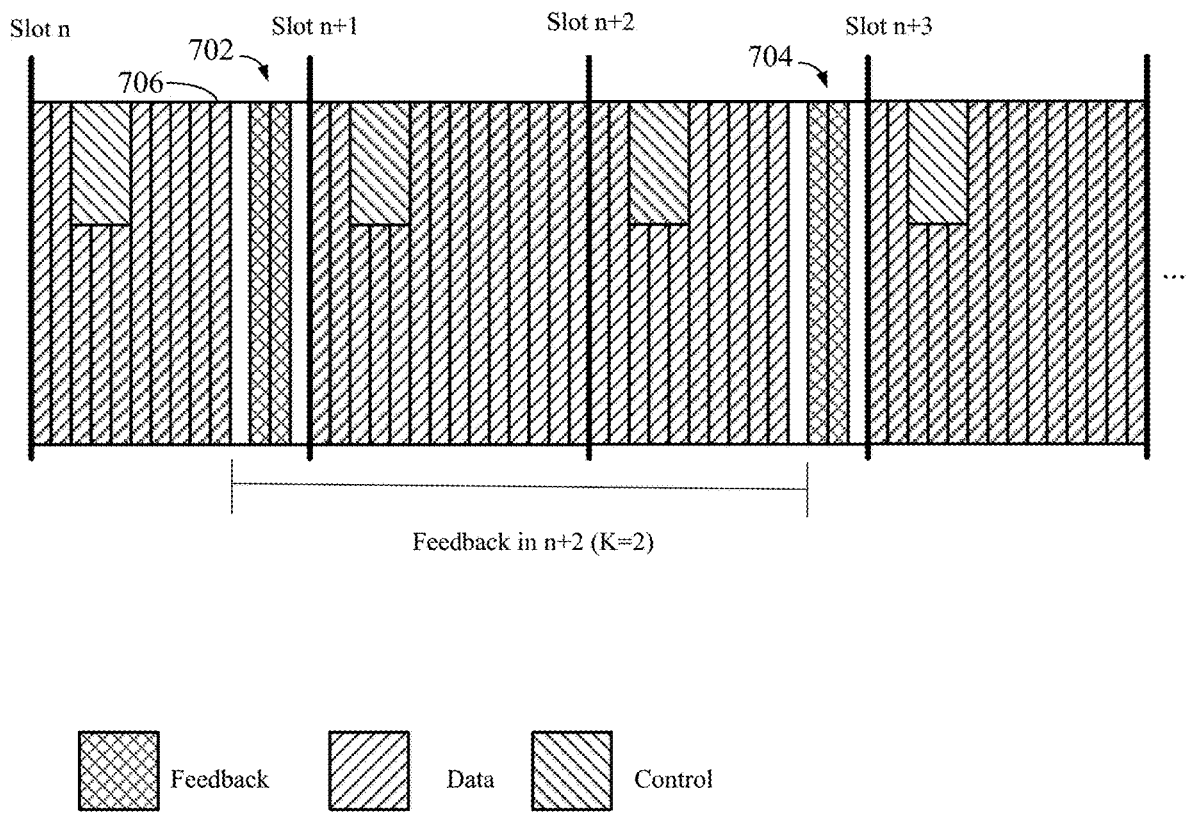
FIG. 7 is a diagram illustrating an example sidelink feedback timeline, in accordance with certain aspects of the present disclosure.

FIG. 7 is a diagram illustrating an example sidelink feedback timeline, in accordance with certain aspects of the present disclosure. The example HARQ feedback timeline is discussed in greater detail below.

As discussed above (e.g., with respect to FIG. 6), time resources (e.g., slots) in a resource pool allocated for sidelink communication may be physically non-consecutive (i.e., separated in time). According to certain aspects, within the time resources in the sidelink resource pool, resources allocated for providing feedback (e.g., physical sidelink feedback channel (PSFCH) resources) can be configured. In some examples, PSFCH may be configured periodically with a period of N slot(s). The period, N, may be a configured value (e.g., with a value of 1, 2, or 4 slots). For example, a UE can be provided, by a parameter (e.g., periodPSFCHresource), a number of slots in a resource pool for a period of PSFCH transmission occasion resources. If the number is zero, PSFCH transmissions from the UE in the resource pool are disabled. In some cases a UE may be indicated by higher layers to not transmit a PSFCH in response to a physical sidelink shared channel (PSSCH) reception.

According to certain aspects, the HARQ feedback timeline may configure a timeline for the UE to provide HARQ feedback for a data transmission, such as a physical sidelink shared channel (PSSCH) transmission. A UE can be indicated by a sidelink control information (SCI) format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.

In some examples, for a sidelink data transmission ending in a slot n, the UE may be configured to provide HARQ feedback in a slot n+a. The parameter a, may correspond to a smallest integer (integer number of slots) that is equal to or greater than a configured duration K with condition that the slot n+a contains PSFCH resources. Thus, the UE transmits the PSFCH in a first slot that includes PSFCH resources and is at least a number of slots, provided by the parameter (e.g., K=MinTimeGapPSFCH), of the resource pool after a last slot of the PSSCH reception. In other words, K may be some minimum delay for providing the feedback, and the UE may be configured to provide the HARQ feedback in soonest available slot containing PSFCH resources after the minimum delay. In some examples, a single K value is configured (e.g., K=2); however, multiple K values could be configured and with different values.

Example Feedback Timeline Based on Logical or Physical Slot Index

In the example shown in FIG. 7, the UE is configured with PSFCH resources every two slots (i.e., N=2) and is configured to provide the feedback no sooner than two slots after the scheduled data (i.e., the minimum delay is K=2). Thus, as shown in FIG. 7, the UE has PSFCH resource 702, 704 every two slots—in slot n and then again in slot n+2. In the example HARQ timeline in FIG. 7, for a data transmission (e.g., a PSSCH) with a last symbol 706 in slot n, the UE may provide the feedback in the slot n+2 in the HARQ resource 704.

According to certain aspects, the HARQ timeline is based on physical slot index. Thus, in the example shown in FIG. 7, the UE provides the HARQ feedback in the first available slot with PSFCH resources that occurs after the configured K number of physical slots.

Figure 8:
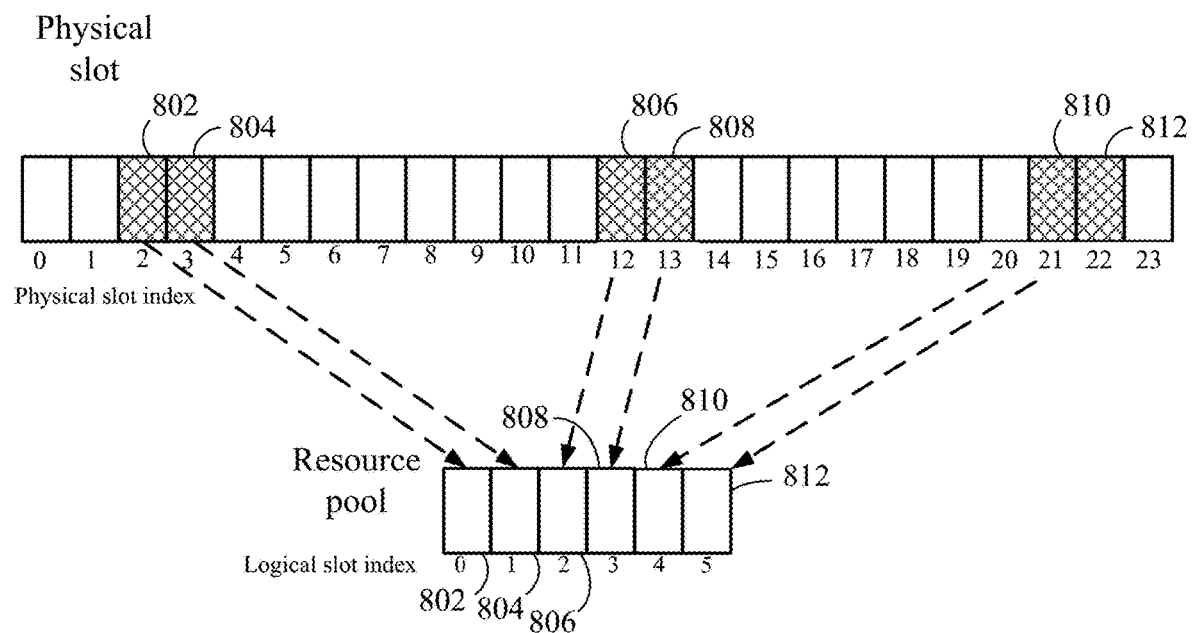
FIG. 8 is a diagram illustrating example non-consecutive physical slot indices corresponding to consecutive logical slot indices in a sidelink resource pool, in accordance with certain aspects of the present disclosure.

According to certain aspects, the HARQ timeline is based on logical slot index. In some examples, a logical slot index may be numbered by where the slot occurs in the resource pool. As shown in FIG. 8, the slots may have a physical slot index number from physical slot index #0, physical slot index #1, . . . , physical slot index #23, and so on. As discussed above, the sidelink resource pool may include physically non-consecutive slots. In the example shown in FIG. 8, the slots 802, 804, 806, 808, 810, and 812, having the non-consecutive physical slot indices #2, 3, 12, 13, 21, and 22, respectively, may be configured for sidelink in a sidelink resource pool. Although the slots in the sidelink resource pool are physical non-consecutive, the slots may be logically consecutive in the sidelink resource pool. For example, the slots 802, 804, 806, 808, 810, and 812 are assigned by logical slot indices #0, 1, 2, 3, 4, 5, respectively, in the sidelink resource pool. In this example, the UE may provide the HARQ feedback in the first available logical slot (slot in the resource pool) with PSFCH resources that occurs after the configured K number of logical slots (e.g., which may be a longer duration when the logical slots correspond to non-consecutive physical slots).

Example Sidelink Feedback Delay Constraint

According to certain aspects, the HARQ feedback timeline (for either of the physical slot index-based or logical slot index-based), may include a feedback delay constraint may be configured. The feedback delay constraint may specify a threshold duration (e.g., a maximum threshold) between the data transmission (e.g., PSSCH) and the determined available slot for the feedback (e.g., the determined slot based on the HARQ timeline), after which the feedback may be dropped (e.g., considered as too stale, and not transmitted).

In some examples, the feedback delay constraint may be configured (e.g., by the BS), or preconfigured at the UE. The feedback delay constraint may be in the units of time (e.g., milliseconds) or in the units of slots. The time and/or slots may depend on the subcarrier spacing. In an illustrative example, the UE may be configured (or preconfigured), with a 5 ms feedback delay constraint and a 30 kHz SCS. Then, the 5 ms feedback delay constraint is equivalent to duration of 10 slots for 30 kHz subcarrier spacing. In this example, the UE may drop the feedback if the determined feedback slot has more than 10 slots separation from the last slot having the data transmission.

In some examples, the UE can determine the feedback delay constraint. The UE may determine the feedback delay constraint based on a mapping. The UE may determine the feedback delay constraint from the packet delay budget (PDB) associated to the data transmission. For example, for each PDB value, there may be an associated feedback delay constraint. The mapping may ensure that for a larger PDB value, the feedback delay constraint may be larger. For instance, for a 5 ms PDB, the mapped feedback delay constraint may be 2 ms, while for a 20 ms PDB, the mapped feedback delay constraint may be 10 ms. In some examples, the PDB value may be directly used to determine if a feedback should be dropped or not (e.g., the feedback delay constraint is the same as PDB). In this example, for a sidelink data transmission with PDB of 10 ms, feedback for the data transmission will be dropped if the duration from the feedback slot to the data transmission slot is larger than (or, larger than or equal to) 10 ms.

Thus, when the UE determines the feedback slot based on the HARQ timeline, the UE can determine the physical slot interval between the data transmission to the slot with the available feedback transmission resource. If the physical slot interval is larger than the feedback delay constraint (e.g., threshold), then the UE drops the feedback (i.e., does not transmit the feedback). In an illustrative example, for a 3 ms PDB (which may correspond to 6 slots for a 30 kHz subcarrier spacing), the UE drops the feedback if the physical slot interval (between the data and feedback slot) is larger than 6 slots. The data transmitter UE can apply the same rule, so the data transmitter UE will not expect HARQ feedback if feedback delay constraint is larger than the threshold.

Example Sidelink Feedback Handling with Partial Slot in Resource Pool

As mentioned above, in some examples, the resource pool for sidelink may include slots with only of portion of the symbols or RBs allocated for sidelink in those slots.

According to certain aspects, when a determined feedback slot based on the HARQ timeline (e.g., a first slot occurring n+a slots after the PSSCH) has less than a threshold number of symbols and/or less than a threshold number of RBs allocated for sidelink, the UE will transmit (or receive) only the feedback in that slot. For example, the UE will transmit (or receive) the PSFCH in the slot, but will not transmit (or expect to receive and/or monitor) anything on the PSCCH or PSSCH in that slot.

According to certain aspects, when the determined feedback slot based on the HARQ timeline has less than a threshold number of symbols or RBs allocated for sidelink, the UE will not consider that slot as available for feedback. For example, referring to the example feedback timeline describe above, in determining the feedback slot, the slot is first slot after the configured duration K and having at least the threshold number of P resources (slots or RBs) in the slot.

According to certain aspects, when the determined feedback slot based on the HARQ timeline is allocated (e.g., indicated, configured, or preconfigured) for sidelink synchronization signal transmission or reception, the UE will not consider that slot as available for feedback. For example, referring to the example feedback timeline describe above, in determining the feedback slot n+a, the slot n+a is the first slot that occurs after the configured duration K having PFSCH resources and not allocated for sidelink synchronization signal transmission or reception.

Figure 9:
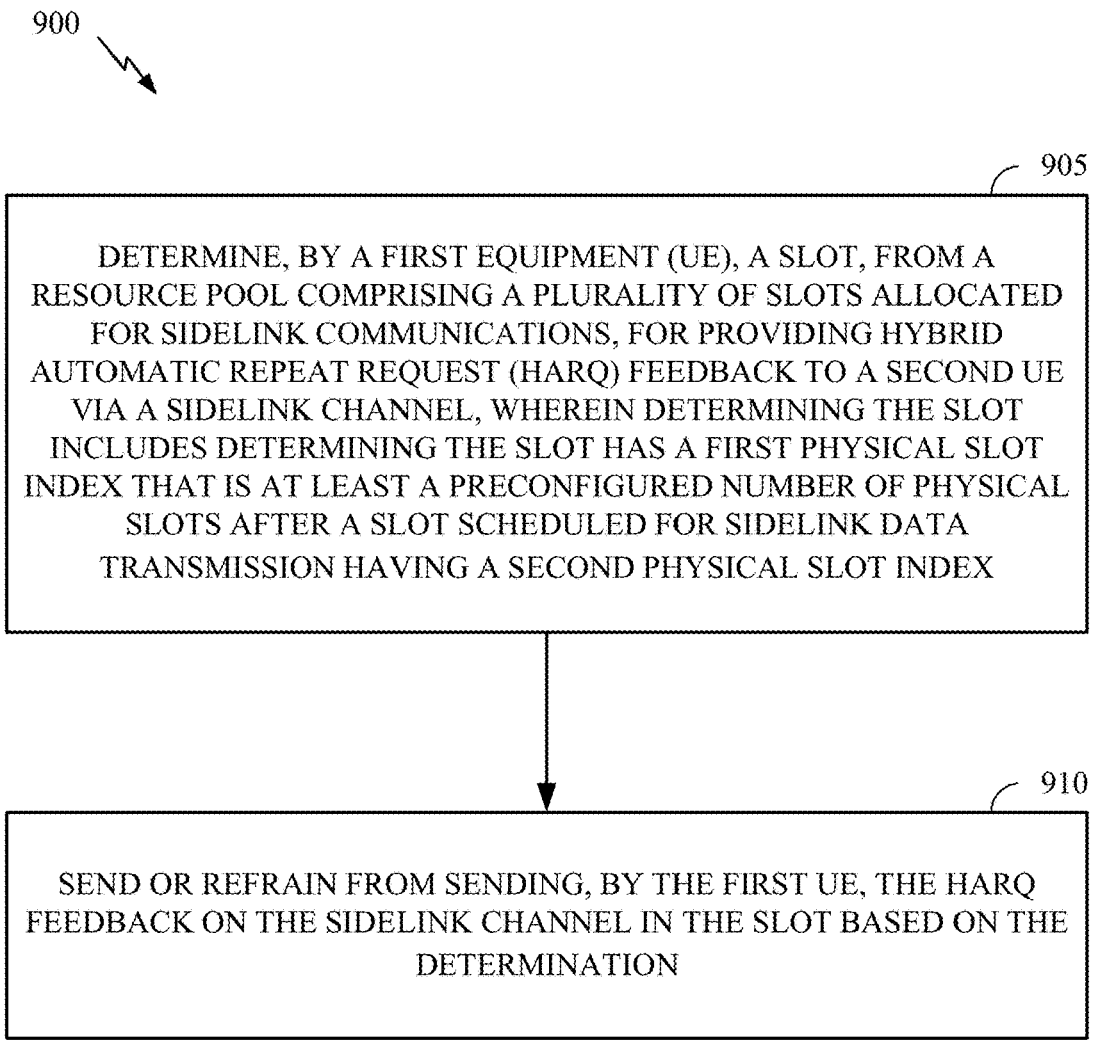
FIG. 9 is a flow diagram illustrating example operations for sidelink feedback in a resource pool by a UE, in accordance with certain aspects of the present disclosure.

FIG. 9 is a flow diagram illustrating example operations 900 for wireless communication, in accordance with certain aspects of the present disclosure. The operations 700 may be performed, for example, by a sidelink UE (e.g., such as a UE 120a in the wireless communication network 100). Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at 905, by determining a slot, from a resource pool comprising a plurality of slots allocated for sidelink communications, for providing HARQ feedback to a second UE via a sidelink channel (e.g., a PSCCH). Determining the slot may include determining the slot has a first physical slot index that is at least a preconfigured number of physical slots (a>K) after a slot (n) scheduled for sidelink data transmission (e.g., PSSCH) having a second physical slot index.

In some examples, the resource pool includes one or more physically non-consecutive slots (e.g., in licensed or unlicensed spectrum). The physically non-consecutive slots may include slots at configured periodicity.

In some examples, when determining the feedback slot, the first UE may consider a slot as unavailable for feedback when an amount of RBs or symbols in the slot allocated for sidelink communications is less than a threshold. Additionally or alternatively, when determining the feedback slot, the first UE may consider a slot as unavailable for feedback when the slot is allocated for sidelink synchronization signal transmission or reception.

According to certain aspects, the first UE may send the feedback and drop other sidelink transmissions in the determined slot when the amount of RBs or symbols in the slot allocated for sidelink communications is less than a threshold.

At 910, the first UE sends, or refrains from sending, the HARQ feedback on the sidelink channel in the slot based on the determination. According to certain aspects, the first UE may determine to drop the HARQ feedback in the slot when the number of physical slots from the sidelink data transmission to the determine slot exceeds a feedback delay threshold. The first UE may determine to send the HARQ feedback in the slot when the number of physical slots is at or below the feedback delay threshold. In some examples, the feedback delay threshold is configured. In some examples, the UE determines the feedback delay threshold based on a packet delay budget.

Figure 10:
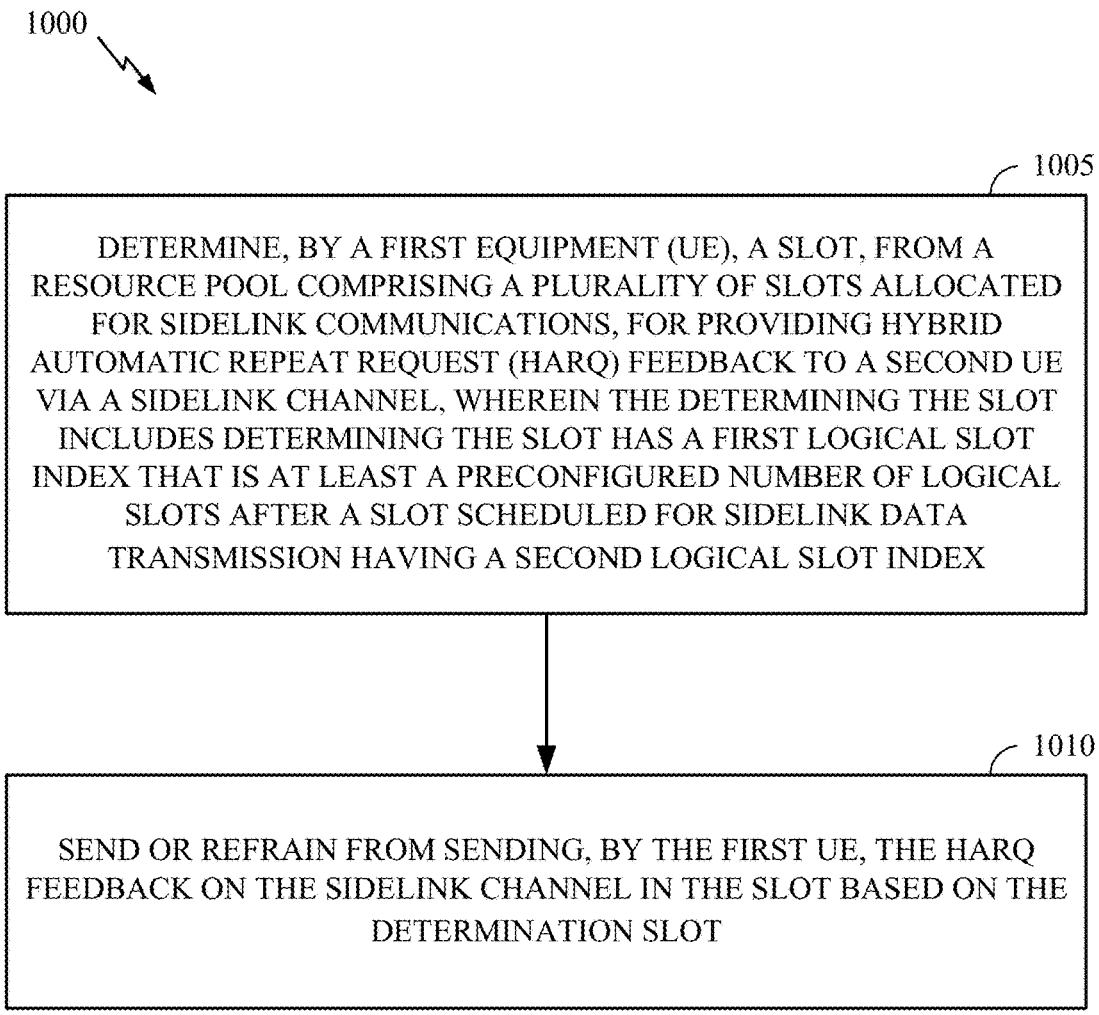
FIG. 10 is a flow diagram illustrating example operations for sidelink feedback in a resource pool by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a sidelink UE (e.g., such as a UE 120*b* in the wireless communication network 100). Operations 1000 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at 1005, by determining a slot, from a resource pool including a plurality of slots (e.g., in licensed or unlicensed spectrum) allocated for sidelink communications, for providing HARQ feedback to a second UE via a sidelink channel (e.g., a PSFCH). Determining the slot includes determining the slot has a first logical slot index that is at least a preconfigured number of logical slots after a slot scheduled for sidelink data transmission having a second logical slot index In some examples, the resource pool includes one or more physically non-consecutive slots having consecutive logical slot indices. The physically non-consecutive slots may include slots at configured periodicity In some examples, when determining the feedback slot, the first UE may consider a slot as unavailable for feedback when an amount of RBs or symbols in the slot allocated for sidelink communications is less than a threshold. Additionally or alternatively, when determining the feedback slot, the first UE may consider a slot as unavailable for feedback when the slot is allocated for sidelink synchronization signal transmission or reception.

According to certain aspects, the first UE may send the feedback and drop other sidelink transmissions in the determined slot when the amount of RBs or symbols in the slot allocated for sidelink communications is less than a threshold.

At 1010, the first UE sends, or refrains from sending, the HARQ feedback on the sidelink channel in the slot based on the determined slot. According to certain aspects, the first UE may determine to drop the HARQ feedback in the slot when the number of physical slots from the sidelink data transmission to the determine slot exceeds a feedback delay threshold. The first UE may determine to send the HARQ feedback in the slot when the number of physical slots is at or below the feedback delay threshold. In some examples, the feedback delay threshold is configured. In some examples, the UE determines the feedback delay threshold based on a packet delay budget.

Figure 11:
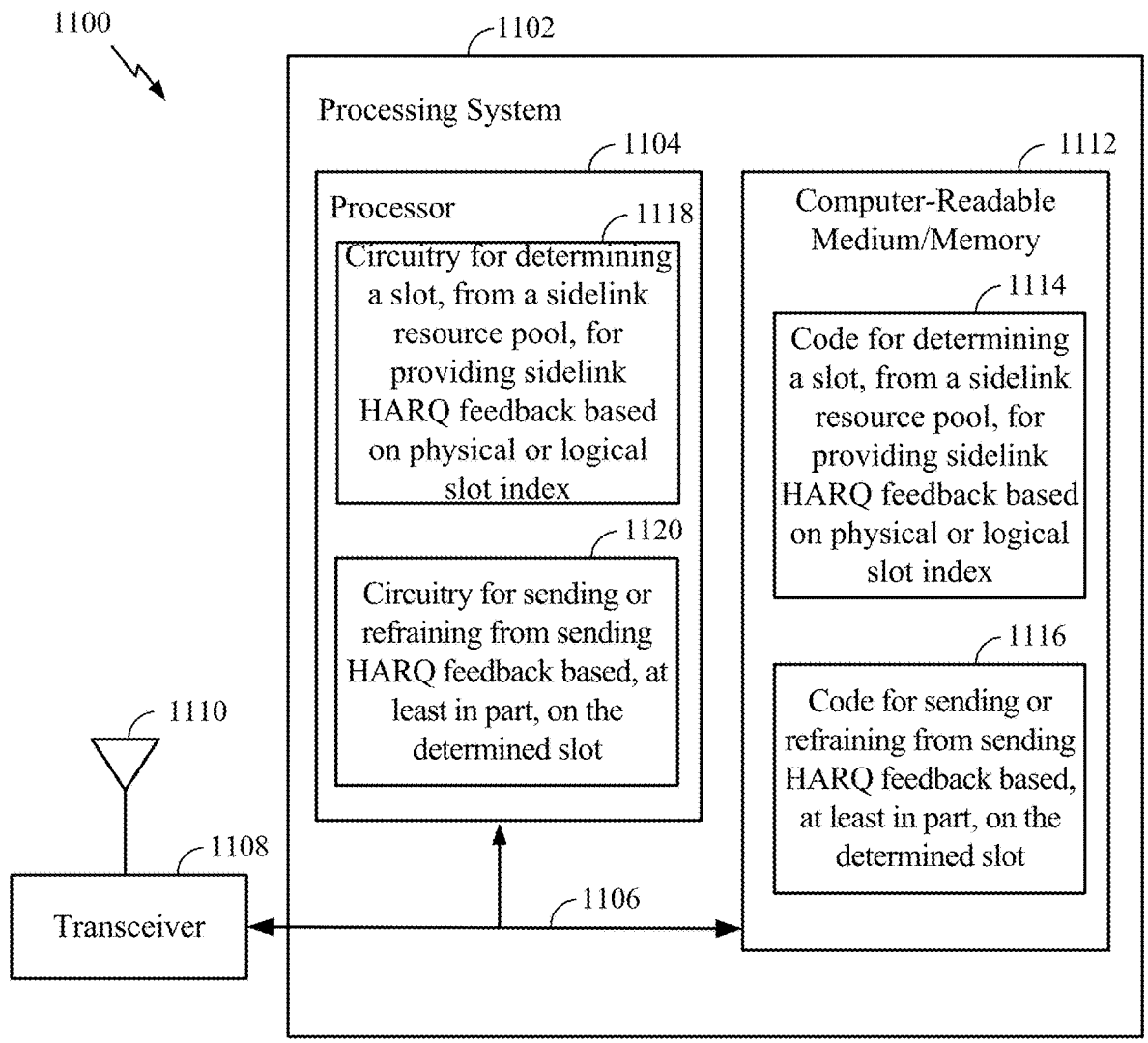
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9 and/or FIG. 10. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1012 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9 and/or FIG. 10, or other operations for performing the various techniques discussed herein for a sidelink HARQ feedback in resource pool. In certain aspects, computer-readable medium/memory 1112 stores code 1114 for determining a slot, from a sidelink resource pool, for providing sidelink HARQ feedback based on a physical or logical slot index; and code 1116 for sending or refraining from sending HARQ feedback based at least in part on the determined slot, in accordance with aspects of the present disclosure. In certain aspects, the processor 1104 has circuitry configured to implement the code stored in the computer-readable medium/memory 1112. The processor 1104 includes circuitry 1118 for determining a slot, from a sidelink resource pool, for providing sidelink HARQ feedback based on a physical or logical slot index; and circuitry 1120 for sending or refraining from sending HARQ feedback based at least in part on the determined slot, in accordance with aspects of the present disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:
   determining a first slot, from a resource pool comprising a plurality of logically consecutive slots allocated for sidelink communications including at least two logically consecutive slots that are physically non-consecutive slots, for providing hybrid automatic repeat request (HARQ) feedback to a second UE via a sidelink channel, wherein determining the first slot includes determining the first slot has a first physical slot index that is at least a preconfigured number of physical slots after a second slot scheduled for sidelink data transmission and having a second physical slot index;
   considering the first slot as unavailable for the HARQ feedback when an amount of resource blocks (RBs) or symbols allocated for the sidelink communications in the first slot is less than a threshold amount; and
   sending or refraining from sending the HARQ feedback on the sidelink channel in the first slot based on the determination and based on the considering the first slot as unavailable for the HARQ feedback.

2. The method of claim 1, wherein the plurality of logically consecutive slots in the resource pool comprise a plurality of physically non-consecutive slots at a configured periodicity.

3. The method of claim 1, wherein determining the first slot includes determining a next slot in the resource pool that occurs after the preconfigured number of physical slots from the second slot scheduled for the sidelink data transmission and having the second physical slot index.

4. The method of claim 1, further comprising considering the first slot as unavailable for the HARQ feedback when the first slot allocated for the sidelink communications is configured or indicated as a slot for sidelink synchronization signal transmission or reception, wherein the sending or refraining comprises refraining from sending the HARQ feedback on the sidelink channel in the first slot based on considering the first slot as unavailable for the HARQ feedback.

5. The method of claim 1, wherein the sending or refraining comprises:
   refraining from sending the HARQ feedback on the sidelink channel in the first slot when a number of physical slots from the sidelink data transmission to the first slot exceeds a feedback delay threshold; and
   sending the HARQ feedback on the sidelink channel in the first slot when the number of physical slots from the sidelink data transmission to the first slot is at or below the feedback delay threshold.

6. The method of claim 5, wherein the feedback delay threshold is preconfigured at the first UE.

7. The method of claim 5, further comprising determining the feedback delay threshold based on a packet delay budget.

8. The method of claim 1, wherein the sidelink channel comprises a physical sidelink feedback channel (PSFCH).

9. The method of claim 1, wherein the resource pool comprises resources in a licensed spectrum.

10. A method for wireless communications by a first user equipment (UE), comprising:
    determining a first slot, from a resource pool comprising a plurality of logically consecutive slots allocated for sidelink communications including at least two logically consecutive slots that are physically non-consecutive slots, for providing hybrid automatic repeat request (HARQ) feedback to a second UE via a sidelink channel, wherein determining the first slot includes determining the first slot has a first physical slot index that is at least a preconfigured number of physical slots after a second slot scheduled for sidelink data transmission and having a second physical slot index;
    sending or refraining from sending the HARQ feedback on the sidelink channel in the first slot based on the determination; and
    determining to send the HARQ feedback, and to drop sidelink transmissions other than the HARQ feedback, in the first slot when an amount of resource blocks (RBs) or symbols allocated for the sidelink communications in the first slot is less than a threshold amount.

11. A method for wireless communications by a first user equipment (UE), comprising:
    determining a first slot, from a resource pool comprising a plurality of logically consecutive slots allocated for sidelink communications including at least two logically consecutive slots that are physically non-consecutive slots, for providing hybrid automatic repeat request (HARQ) feedback to a second UE via a sidelink channel, wherein the determining the first slot includes determining the first slot has a first logical slot index that is at least a preconfigured number of logical slots after a second slot scheduled for sidelink data transmission and having a second logical slot index;
    considering the first slot as unavailable for the HARQ feedback when an amount of resource blocks (RBs) or symbols allocated for the sidelink communications in the first slot is less than a threshold amount; and
    sending or refraining from sending the HARQ feedback on the sidelink channel in the first slot based on the determination and based on the considering the first slot as unavailable for the HARQ feedback.

12. The method of claim 11, wherein the plurality of logically consecutive slots in the resource pool comprise a plurality of physically non-consecutive slots at a configured periodicity.

13. The method of claim 11, wherein determining the first slot includes determining a next logically consecutive slot in the resource pool configured for the HARQ feedback that occurs after the preconfigured number of logical slots from the second slot scheduled for the sidelink data transmission and having the second logical slot index.

14. The method of claim 11, wherein the sending or refraining comprises:
    refraining from sending the HARQ feedback on the sidelink channel in the first slot when a number of physical slots from the sidelink data transmission to the first slot exceeds a feedback delay threshold; and
    sending the HARQ feedback on the sidelink channel in the first slot when the number of physical slots from the sidelink data transmission to the first slot is at or below the feedback delay threshold.

15. The method of claim 14, wherein the feedback delay threshold is preconfigured at the first UE.

16. The method of claim 14, further comprising determining the feedback delay threshold based on a packet delay budget.

17. The method of claim 11, further comprising considering the first slot as unavailable for the HARQ feedback when the first slot allocated for the sidelink communications is configured or indicated as a slot for sidelink synchronization signal transmission or reception, wherein the sending or refraining comprises refraining from sending the HARQ feedback on the sidelink channel in the first slot based on considering the first slot as unavailable for the HARQ feedback.

18. The method of claim 11, wherein the sidelink channel comprises a physical sidelink feedback channel (PSFCH).

19. The method of claim 11, wherein the resource pool includes resources in a licensed spectrum.

20. A method for wireless communications by a first user equipment (UE), comprising:
determining a first slot, from a resource pool comprising a plurality of logically consecutive slots allocated for sidelink communications including at least two logically consecutive slots that are physically non-consecutive slots, for providing hybrid automatic repeat request (HARQ) feedback to a second UE via a sidelink channel, wherein the determining the first slot includes determining the first slot has a first logical slot index that is at least a preconfigured number of logical slots after a second slot scheduled for sidelink data transmission and having a second logical slot index;
sending or refraining from sending the HARQ feedback on the sidelink channel in the first slot based on the determination; and
determining to send the HARQ feedback, and to drop sidelink transmissions other than the HARQ feedback, in the first slot when an amount of resource blocks (RBs) or symbols allocated for the sidelink communications in the first slot is less than a threshold amount.

21. An apparatus for wireless communication, comprising:
at least one processor; and
a memory coupled to the at least one processor, the memory comprising code executable by the at least one processor to cause the apparatus to:
determine a first slot, from a resource pool comprising a plurality of logically consecutive slots allocated for sidelink communications including at least two logically consecutive slots that are physically non-consecutive slots, for providing hybrid automatic repeat request (HARQ) feedback to a user equipment (UE) via a sidelink channel, wherein the code executable by the at least one processor to cause the apparatus to determine the first slot includes code executable by the at least one processor to cause the apparatus to determine the first slot has a first physical slot index that is at least a preconfigured number of physical slots after a second slot scheduled for sidelink data transmission and having a second physical slot index;
consider the first slot as unavailable for the HARQ feedback when an amount of resource blocks (RBs) or symbols allocated for the sidelink communications in the first slot is less than a threshold amount; and
send or refrain from sending the HARQ feedback on the sidelink channel in the first slot based on the determination and based on the considering the first slot as unavailable for the HARQ feedback.

22. An apparatus for wireless communication, comprising:
at least one processor; and
a memory coupled to the at least one processor, the memory comprising code executable by the at least one processor to cause the apparatus to:
determine a first slot, from a resource pool comprising a plurality of logically consecutive slots allocated for sidelink communications including at least two logically consecutive slots that are physically non-consecutive slots, for providing hybrid automatic repeat request (HARQ) feedback to a user equipment (UE) via a sidelink channel, wherein the code executable by the at least one processor to cause the apparatus to determine the first slot includes code executable by the at least one processor to cause the apparatus to determine the first slot has a first physical slot index that is at least a preconfigured number of physical slots after a second slot scheduled for sidelink data transmission and having a second physical slot index;
determine a next logically consecutive slot in the resource pool configured for sidelink HARQ feedback that occurs after the preconfigured number of physical slots from the second slot scheduled for the sidelink data transmission and having the second physical slot index; and
send or refrain from sending the HARQ feedback on the sidelink channel in the first slot based on the both determination.

23. An apparatus for wireless communication, comprising:
at least one processor; and
a memory coupled to the at least one processor, the memory comprising code executable by the at least one processor to cause the apparatus to:
determine a first slot, from a resource pool comprising a plurality of logically consecutive slots allocated for sidelink communications including at least two logically consecutive slots that are physically non-consecutive slots, for providing hybrid automatic repeat request (HARQ) feedback to a user equipment (UE) via a sidelink channel, wherein the code executable by the at least one processor to cause the apparatus to determine the first slot includes code executable by the at least one processor to cause the apparatus to determine the first slot has a first logical slot index that is at least a preconfigured number of logical slots after a second slot scheduled for sidelink data transmission and having a second logical slot index;
consider the first slot as unavailable for the HARQ feedback when an amount of resource blocks (RBs) or symbols allocated for the sidelink communications in the first slot is less than a threshold amount; and
send or refrain from sending the HARQ feedback on the sidelink channel in the first slot based on the determination and based on the considering the first slot as unavailable for the HARQ feedback.

24. The apparatus of claim 23, wherein the code executable by the at least one processor to cause the apparatus to determine the first slot includes code executable by the at least one processor to cause the apparatus to determine a next logically consecutive slot in the resource pool configured for sidelink HARQ feedback that occurs after the preconfigured number of logical slots from the second slot scheduled for the sidelink data transmission and having the second logical slot index.

* * * * *